A. Bowen.
Thrashing Mach.
Nº 11,824.  Patented Oct. 24, 1854.
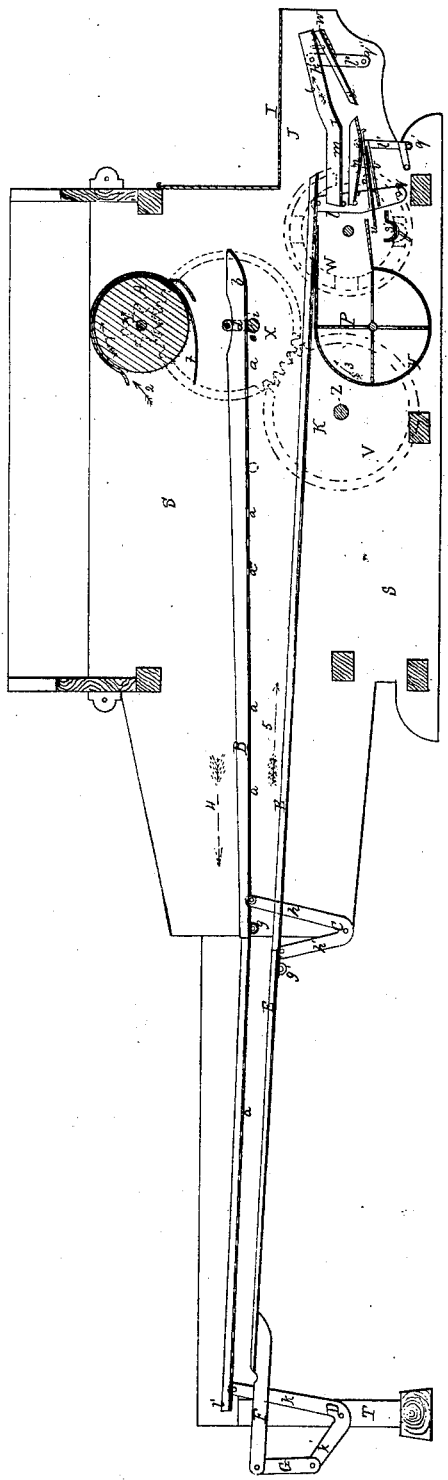

UNITED STATES PATENT OFFICE.

ARCHIBALD BOWEN, OF WADESVILLE, VIRGINIA.

STRAW AND GRAIN SEPARATOR.

Specification of Letters Patent No. 11,824, dated October 24, 1854.

*To all whom it may concern:*

Be it known that I, ARCHIBALD BOWEN, of Wadesville, in the county of Clark and State of Virginia, have invented a new and useful Improvement in Grain-Separators; and I do hereby declare that the following is a full, clear, and exact description of the construction and operation of the same, reference being had to the annexed drawing, forming part of this specification, which represents a vertical longitudinal section of the separator.

My invention consists in combining in a manner hereafter to be described, two reciprocating beds, the upper perforated and inclined toward the foot of the machine, and the lower inclined toward the head, so that the grain and straw shall be received from the threshing cylinder upon the upper bed, which while it causes the straw to traverse its entire length and leave the machine at its foot, permits the grain to fall through its perforations upon the lower bed, which by its inclination and reciprocating motion carries the grain to the chaff separating portion of the machine, where by blast and screens the grain is thoroughly cleaned; the peculiar arrangement and construction of the screen forming also a novel feature of my machine, which will be fully set forth in this specification.

To enable others skilled in the art to make and use my invention I will proceed to describe its construction and operation.

In the drawing A is the threshing cylinder revolving as shown by arrow 1 and acting on the over threshing principle, the grain and straw entering as indicated by arrow 2; a suitable feeding hopper being provided for the purpose, but as this portion of the machine is well known and forms no part of my claim a detailed description is not here given; the threshing arrangement need not necessarily be such as above set forth, as the machine is equally well adapted to the ordinary under threshing cylinder and concave.

B is the upper bed composed of sheet metal, having the perforations $a$ punched in it from the top; these perforations diminish in size from $b$ to $b'$. The upper extremity of this bed is supported by the bar $c$ which by reason of two cranks $d$ (one at each extremity of the bar) revolves around the shaft $e$, causing the end $b$ of bed to rise and fall, and reciprocate longitudinally; two straps $i$ keeping the bed upon the bar $c$, as the bar moves around the shaft $e$. This bed is jointed at $g$, and is supported near that joint by the long arms $h$, of two bent levers C, placed one on each side of the bed. The extremity $b'$ is supported by the arms $k$ of two bent levers D.

The lower bed E which is a plain sheet of metal, inclines toward the head of the machine, and is supported by the arms $k'$ of levers D, arms $h$ of levers C, and at the head by two levers $l$ one on each side of the bed. The arms F of the bed E are jointed with the rods G connecting the bed E with the levers D, and through which motion is communicated to the bed E from the bed B.

The levers $l$ besides sustaining the head of the bed E, also support one extremity of the screens $m$ and $n;$ the other ends of those screens being supported by the levers $l'$ and $l''$, these levers have their fulcra at $q$ $q'$ $q''$. The termination of the screen $m$ is an inclined plane $p$ connected with the screen by the steeper plane $r$, the object of which will be hereafter fully set forth.

P is the fan revolving as shown by arrow 3, within the chamber H, and S' is a spout which receives the cleaned grain and conveys it outside of the machine to the wheel W, which discharges it into bags.

S is one of the sides of the machine. The beds B and E are so constructed as to be capable of separation at $g$ $g'$ for facility of transportation.

V is the driving wheel to which power is applied in any suitable manner, in the drawing it is represented as being rotated by the crank K; this wheel gives motion to the wheel X and through it to the pinion Y, for driving the threshing cylinder and rotating the shaft $e$.

The operation of my separator is as follows: The grain and straw after passing through the threshing arrangement as indicated by arrows 1 and 2, is carried over a grating beneath the cylinder, one of the bars of which is represented by $t$, this permits a large proportion of the grain and chaff to fall at once upon the bed B, while the remainder together with the straw, on leaving the grating is received on the same bed, which by the shaft $e$ and connection with the crank $d$, is continually raised, lowered, and reciprocated so as to give the straw a motion in the direction of arrow 4, while the grain and chaff presses through the perforations $a$ to the lower bed E, which by reason of its connection with the levers D receives a reciprocating motion; this motion together with the inclination of the bed carries the grain in the direction shown by arrow 5, and discharges it upon the screen m, which receives a reciprocating motion from the levers l. The grain on leaving the bed E receives the blast from the fan P, which carries with it the chaff, and permits the grain to pass through the screen m to the screen n, and through this latter to the inclined board o, which passes it to the spout S', through which it proceeds to the wheel W. Should it be desired to separate cockle from the grain, the board o can be withdrawn, permitting the grain to be received on the screen u, through which the cockle will pass to the board v, while the grain will pass over the screen u to the spout S' and reach the wheel W as before described.

The cover I which extends across the machine above the screens, leaves but the passage J for the issue of the current of air from the fan, causing it as it sweeps over the screen m and up the inclined plane r in the direction of arrow 6, to create an eddy at the point where the plane r bends into the plane p, and thereby cause any grain which may be carried by the blast to drop upon the plane p, and rolling back pass through the screen m. The slide w when drawn out catches the tailings, if any, and causes them by the board x to fall into a receptacle placed under the machine.

The rotation of the wheel X produces the motion of the entire separating apparatus; the cranks d reciprocating and shaking the bed B, which motion of the bed B through the levers C and D reciprocates the bed E, which in its turn gives motion to the levers l causing the reciprocation of the several screens. The fan P and wheel W are revolved by bands from the shaft Z and are the only portion of the machine which receive motion by bands and pulleys.

The simplicity of the construction and operation of this machine renders it a valuable improvement in grain separators, as the grain being received on the upper bed is thoroughly separated from the straw during its passage over the bed, and by the action of the bed E descends in the opposite direction to the mill, while the straw passes over the tail of the machine; thus effectually making the first separation. The second separation is no less thorough, as the grain receives the blast under the best possible circumstances to insure the blowing off of the chaff, while from the confining of the blast above the screen m, and the arrangement of the inclined planes r and p, the liability of the grain to be blown off is greatly diminished. The further separation of the grain from cockle which the screen u admits of, is important, and adds to the completeness of the arrangement of the several parts of the machine.

What I claim as my invention and desire to secure by Letters Patent, is—

1. The method of separating the grain and chaff from the straw, by the combination of the inclined vibrating bed E with the perforated jointed bed B, arranged and operating substantially as herein fully set forth; so that the grain and chaff are separated from the straw, and the straw conveyed over the foot of the machine by the bed B, while the bed E conveys the grain and chaff in the opposite direction, and submits the same to the action of the fan blast for further separation.

2. The extending of the upper screen m by the double inclined plane r p, in combination with a blast compressed by a covering I above the screen, for the purpose that an eddy may be formed by the blast, and the grain if carried too far by the blast be returned upon the inclined plane p to screen m, substantially as herein fully set forth.

In testimony whereof, I have hereunto signed my name before two subscribing witnesses.

ARCHIBALD BOWEN.

Witnesses:
 GEO. PATTEN,
 SAML. GRUBB.